March 3, 1942.       R. R. SEARLES       2,275,325
BEARING SEAL
Original Filed Nov. 5, 1936
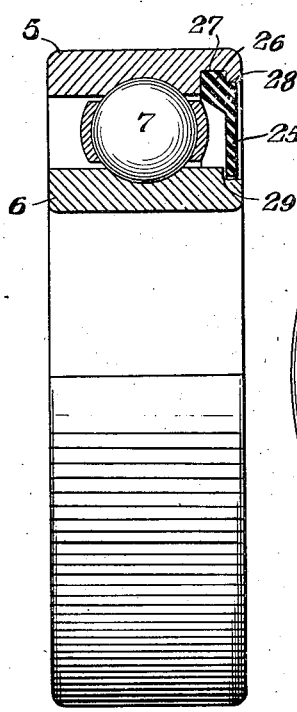
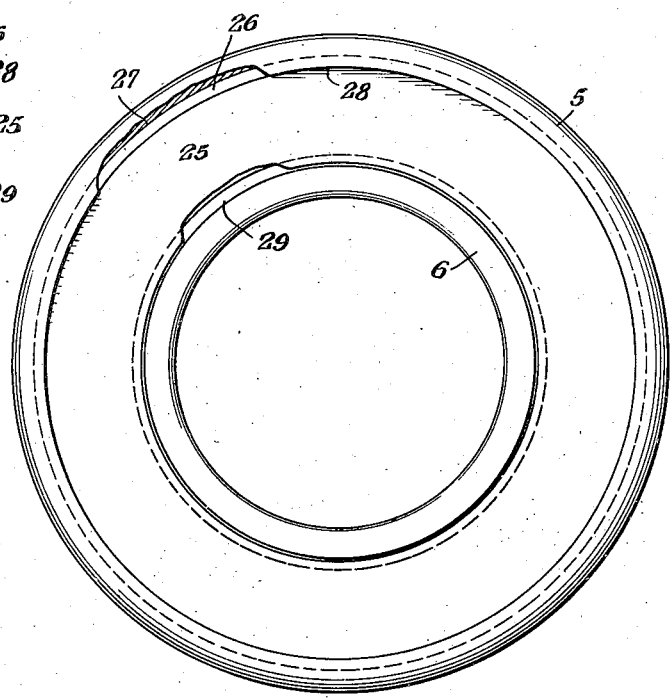
INVENTOR
RAYMOND R. SEARLES
ATTORNEYS.

Patented Mar. 3, 1942

2,275,325

UNITED STATES PATENT OFFICE 2,275,325

BEARING SEAL

Raymond R. Searles, New Britain, Conn., assignor to The Fafnir Bearing Company, New Britain, Conn., a corporation of Connecticut Original application November 5, 1936, Serial No. 109,211. Divided and this application December 12, 1939, Serial No. 308,810

2 Claims. (Cl. 286—5)

My invention relates to a seal bearing. This application is a division of my application, Serial No. 109,211, filed November 5, 1936. As is well known, anti-friction bearings, such as ball bearings, are manufactured to a high degree of precision and proper operation of the bearing presupposes that the rings shall remain round and concentric, that is, that one or both of the rings will not be distorted substantially so as to cause it to be out of round. Various types of seals have been widely used in anti-friction bearings to seal lubricant in and prevent the ingress of foreign material. Such seals have taken various forms, a common form including a metallic annulus, forced into the outer ring friction tight, or swedged or otherwise forced into a groove in the outer ring so as to provide a leak-proof joint. Such seal plates, if not exactly round or if round and applied in a groove in the outer ring, will often distort the outer ring to such an extent as to cause the bearing to be out of round and this is particularly so if the joint between the seal and the outer ring is tight enough so as to be leak-proof. Such bearings will, if forced out of round, soon deteriorate and fail. Other types of seals have been used but are open to other objections.

It is the principal object of my invention to provide an improved form of seal, which will provide a substantially leak-proof joint and yet will in no wise distort the bearing ring carrying the same.

Another object is to provide a bearing having a seal providing a tight joint with the ring carrying the same and which may be readily removed for any purpose desired.

Another object is to provide an anti-friction bearing with an improved seal which, if it engages a metallic part, will not cause undue noise or wear.

It is another object to provide an anti-friction bearing with a seal which may be very quickly and readily assembled and disassembled.

In general the object is to provide an improved form of seal bearing.

Other objects and various features of invention will become apparent to those skilled in the art or will be hereinafter pointed out.

In the drawing which shows, for illustrative purposes, only a preferred form of the invention—

Fig. 1 is an edge view in quarter section of a ball bearing illustrating features of the invention;

Fig. 2 is an axial view in elevation of the bearing shown in Fig. 1, parts being broken away.

In said drawing the bearing includes an outer bearing ring 5 and an inner bearing ring 6, with interposed balls 7. The balls run in races and are held in retainers, all as is common practice. The particular bearing shown is of the unit handling type wherein the balls running in the races hold the two rings against displacement.

In the form shown the seal 25 is provided with a rather wide outer projecting portion 26 fitting in a wide groove 27 in the outer ring. The seal 25 below the projection 26 is offset and bears against the ring surface at 28. The main part of the seal is therefrom moved out so as to be flush with the edge of the bearing. It will be seen that there is a very wide and substantial bearing provided between the outer ring and the seal, so that the latter is securely held against both tipping and accidental displacement. The inner edge of the seal extends into sealing proximity to the inner ring and, as shown, approaches the rabbeted portion 29.

The seal is formed of yielding material, such as rubber or synthetic rubber, preferably of a type of material treated to be or inherently oil resistant. The material is also preferably non-absorbent. The comparative softness of the seal material is assurance against distortion of the ring carrying such a seal and that without sacrifice of a tight seal joint. The yielding material of the seal tends to force itself into very tight sealing engagement with the surface of the bearing ring with which it is engaged. The comparative yield-ability of the seal material also permits expansion of the grease, due either to heating of the bearing or movement of the grease due to normal operation and thus prevents to a large extent the leaking of grease past the spaced-apart seal surfaces between the seal and the ring.

I have herein shown seals at only one side of each bearing. It is to be understood, however, that the same or different seals could be used at opposite sides of all of the bearings when the bearing is exposed at both sides.

While the invention has been described in considerable detail it is to be understood that various other modifications and changes may be made within the scope of the invention as defined in the appended claims.

I claim:

1. In a device of the character indicated, two concentric relatively rotatable members held in spaced apart relationship, one of said members inwardly from one end thereof having an annular groove integrally formed therein, a seal member to extend across the space between said relatively rotatable members for sealing the space therebetween, said seal member including a washer of relatively flexible impervious non-metallic rubber-like material, said washer having a transversely enlarged edge and a generally radially extending projection projecting from said transversely enlarged edge, said projection serving to fit within said groove, and a part of said transversely enlarged edge serving to abut against a surface of said annularly grooved member adjacent one edge of said groove, the main body of said washer extending across the space between said members being offset in an axial direction from said projection on the enlarged edge thereof and at its other edge extending into sealing proximity to the ring at a zone offset axially outwardly from said annular groove and the outer surface being substantially flush with the outer edge of said grooved member.

2. In a device of the character indicated, two concentric relatively rotatable members held in spaced apart relationship, the outer of said members having an annular circumferentially extending integral groove inwardly of the edge thereof and facing the inner of said members, the inner of said members having a rabbeted portion facing said annular groove and offset axially therefrom, a seal for sealing the space between said members including a washer of relatively flexible impervious non-metallic material extending into lubricant sealing relationship with said rabbeted portion at one edge, the opposite edge being transversely enlarged and having a generally radially outwardly extending projection fitting in said groove, a part of said transversely enlarged portion resiliently fitting against said outer member adjacent the outer edge of said groove.

RAYMOND R. SEARLES.